United States Patent
Bruce et al.

(10) Patent No.: US 9,892,169 B2
(45) Date of Patent: *Feb. 13, 2018

(54) EMBEDDED CONTENT SUITABILITY SCORING

(71) Applicant: International Business Machines Corporation, Armonk, NY (US)

(72) Inventors: Edwin J. Bruce, Corinth, TX (US); Romelia H. Flores, Keller, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/384,750

(22) Filed: Dec. 20, 2016

(65) Prior Publication Data

US 2017/0091196 A1    Mar. 30, 2017

Related U.S. Application Data

(63) Continuation of application No. 14/662,269, filed on Mar. 19, 2015.

(51) Int. Cl.
*G06F 17/30* (2006.01)

(52) U.S. Cl.
CPC .... *G06F 17/3053* (2013.01); *G06F 17/30011* (2013.01); *G06F 17/30528* (2013.01)

(58) Field of Classification Search
CPC .......................... G06F 17/2211; G06F 17/2288
See application file for complete search history.

(56) References Cited

U.S. PATENT DOCUMENTS

| | | |
|---|---|---|
| 5,758,358 A | 5/1998 | Ebbo |
| 7,219,298 B2 | 5/2007 | Bates et al. |
| 7,260,568 B2 | 8/2007 | Zhang et al. |
| 8,510,379 B2 | 8/2013 | Howes et al. |
| 8,543,901 B1 | 9/2013 | Diwan |
| 9,177,014 B2 | 11/2015 | Gross |
| 9,229,919 B1 | 1/2016 | Krappe |
| 9,558,160 B2 | 1/2017 | Bruce et al. |
| 2005/0071741 A1 | 3/2005 | Acharya et al. |
| 2005/0116025 A1 | 6/2005 | Davis |
| 2005/0144245 A1 | 6/2005 | Lowe |
| 2012/0093421 A1 | 4/2012 | Kletter |
| 2014/0082006 A1 | 3/2014 | Knight et al. |

(Continued)

OTHER PUBLICATIONS

Bruce et al., "Embedded Content Suitability Scoring", U.S. Appl. No. 15/384,430, filed Dec. 20, 2016, 29 pages.

(Continued)

*Primary Examiner* — Taelor Kim
(74) *Attorney, Agent, or Firm* — Bryan D. Wells; David M. Quinn

(57) ABSTRACT

Embedded content suitability scoring is provided. A plurality of containers of a document is identified. Each container includes a portion of content of the document. A source for a container of the plurality of containers of the document is identified by matching the content of the container to the content of the source. A suitability score for the container is determined based, at least in part, on the content of the container and the content of the source. A suitability category for the container is determined based, at least in part, on the suitability score. The document is presented along with markup of the container that is based, at least in part, on the suitability category.

1 Claim, 5 Drawing Sheets

(56) References Cited

U.S. PATENT DOCUMENTS

| | | |
|---|---|---|
| 2016/0063130 A1 | 3/2016 | Pulfer et al. |
| 2016/0154798 A1 | 6/2016 | Davis et al. |
| 2016/0275051 A1 | 9/2016 | Bruce et al. |
| 2017/0091195 A1 | 3/2017 | Bruce et al. |
| 2017/0177679 A1 | 6/2017 | Miller et al. |

OTHER PUBLICATIONS

Appendix P, List of IBM Patents or Patent Applications Treated as Related, 2 pages, dated Jan. 5, 2017.
Bruce et al., "Embedded Content Suitability Scoring", U.S. Appl. No. 14/662,269, filed Mar. 19, 2015, 32 pages.
Bruce et al., "Embedded Content Suitability Scoring", U.S. Appl. No. 15/138,288, filed Apr. 26, 2016, 29 pages.

300a

302 — To: <recipient_address>
304a — From: <sender_address>
CC: <cc_address>
BCC: <bcc_address>
Subject: <subject_line>

306a — Dear <sender_name>,

308a — Lorem ipsum dolor sit amet, consectetuer adipiscing elit. Maecenas porttitor congue massa. Fusce posuere, magna sed pulvinar ultricies, purus lectus malesuada libero, sit amet commodo magna eros quis urna. Nunc 310a — Fusce est. Vivamus a tellus. Pellentesque habitant morbi tristique senectus et netus et malesuada fames ac turpis egestas. Proin pharetra nonummy pede. Mauris et orci. Aenean nec lorem. In porttitor. Donec laoreet nonummy 312a — Thanks and Regards, <sender_name>
<sender_contact_info>

314a — <corporate_logo>

316a — Attachment_1    Attachment_2 — 318a

FIG. 3A

EMBEDDED CONTENT SUITABILITY SCORING

BACKGROUND OF THE INVENTION

The present invention relates generally to the field of content management, and more particularly to embedded content suitability scoring.

Content management (CM), is a set of processes and technologies that supports the collection, managing, and publishing of information in any form or medium. When stored and accessed via computers, this information has come to be referred to, simply, as content or, to be precise, digital content. Digital content may take the form of text (such as electronic documents), multimedia files (such as audio or video files), or any other file type that follows a content lifecycle requiring management.

SUMMARY

According to one embodiment of the present invention, a method for embedded content suitability scoring is provided. The method includes identifying, by one or more processors, a plurality of containers of a document, wherein each container includes a portion of content of the document; identifying, by one or more processors, a source for a container of the plurality of containers of the document by matching the content of the container to the content of the source; determining, by one or more processors, a suitability score for the container based, at least in part, on the content of the container and the content of the source; determining, by one or more processors, a suitability category for the container based, at least in part, on the suitability score; and presenting, by one or more processors, the document along with markup of the container that is based, at least in part, on the suitability category.

According to another embodiment of the present invention, a computer program product for embedded content suitability scoring is provided. The computer program product comprises a computer readable storage medium and program instructions stored on the computer readable storage medium. The program instructions include program instructions to identify a plurality of containers of a document, wherein each container includes a portion of content of the document; program instructions to identify a source for a container of the plurality of containers of the document by matching the content of the container to the content of the source; program instructions to determine a suitability score for the container based, at least in part, on the content of the container and the content of the source; program instructions to determine a suitability category for the container based, at least in part, on the suitability score; and program instructions to present the document along with markup of the container that is based, at least in part, on the suitability category.

According to another embodiment of the present invention, a computer system for embedded content suitability scoring is provided. The computer system includes one or more computer processors, one or more computer readable storage media, and program instructions stored on the computer readable storage media for execution by at least one of the one or more processors. The program instructions include program instructions to identify a plurality of containers of a document, wherein each container includes a portion of content of the document; program instructions to identify a source for a container of the plurality of containers of the document by matching the content of the container to the content of the source; program instructions to determine a suitability score for the container based, at least in part, on the content of the container and the content of the source; program instructions to determine a suitability category for the container based, at least in part, on the suitability score; and program instructions to present the document along with markup of the container that is based, at least in part, on the suitability category.

BRIEF DESCRIPTION OF THE DRAWINGS

FIG. 3A is a depiction of an example user interface presenting an example document, in accordance with an embodiment of the present invention.

DETAILED DESCRIPTION

Embodiments of the present invention recognize that a modern content management system (CMS) may offer many capabilities for the deposit and maintenance of centralized information. For example, a CMS may provide tracking versions of a document. Embodiments recognize a need for addressing content embedded or attached into higher-level structures or documents. Further, embodiments recognize difficulties when managing content for relevance, accuracy, and security.

Embodiments of the present invention provide for extended content management capabilities. In the description herein, an email message is used as an illustrative example of one implementation of the invention. However, it should be understood that other types of documents and content may be used in other implementations. Embodiments of the present invention provide content management for reused content.

Figure 1:
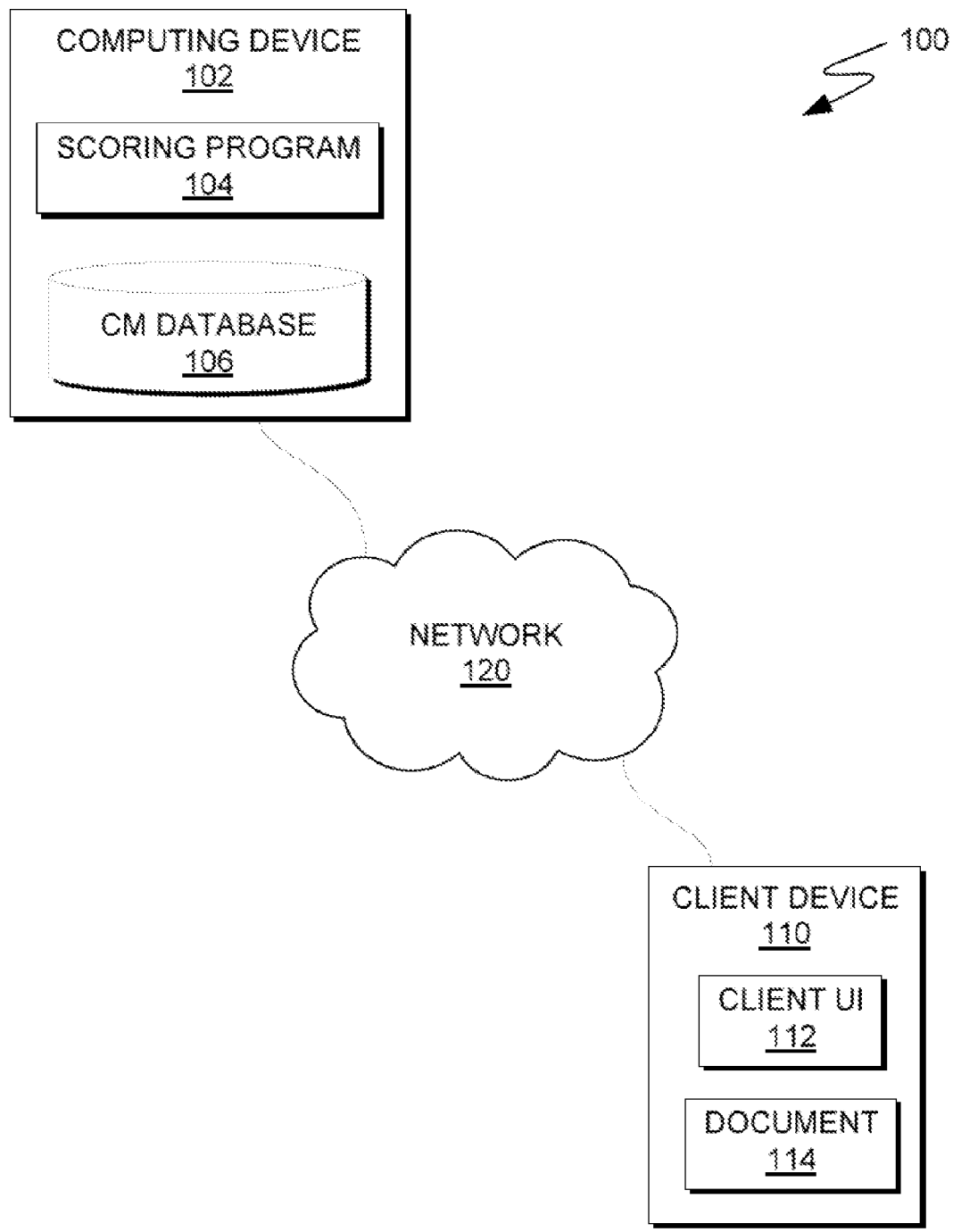
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes scoring program 104 and content management (CM) database 106. Client device 110 includes a user interface (UI), client UI 112, and document 114.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing some or all of scoring program 104, CM database 106, client UI 112, and document 114. Computing device 102 may include internal and external hardware components, as depicted and described in further detail with respect to FIG. 4.

In this exemplary embodiment, scoring program 104 and CM database 106 are stored on computing device 102, and client UI 112 and document 114 are stored on client device 110. In other embodiments, one or more of scoring program 104, CM database 106, client UI 112, and document 114 may reside on other computing devices, provided that each can access and is accessible by each other. In yet other embodiments, one or more of scoring program 104, CM database 106, client UI 112, and document 114 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Scoring program 104 operates to determine a suitability score for one or more portions of content. In one embodiment, scoring program 104 determines a suitability score based on a document and content of a source. For example, scoring program 104 determines a suitability score for each of one or more portions of content of document 114 based on content of a source of CM database 106 that corresponds to each portion of content. In this example, scoring program 104 presents the suitability scores via client UI 112 by presenting document 114 along with markup reflecting the suitability scores.

Document 114 is an electronic document that includes content. In various examples, the content includes text, audio, video, multimedia, or any combination thereof. For example, document 114 may be a newsletter, a periodic report, a chat message (e.g., of an instant messaging program), or an email message. In order to facilitate discussion, embodiments of the present invention are discussed herein using an email message as an illustrative example, but it should be understood that such an example does not limit the scope of the invention. Generally, document 114 is an electronic document that includes content that may be reused from one or more sources.

CM database 106 is a data repository that may be read by scoring program 104. One or more sources having content (e.g., portions of text, audio, video, multimedia, contact information, or other content) may be stored to CM database 106. Each source may be associated with versioning information. The versioning information includes, in various examples, a file name, version number, revision date, and one or more previous versions of the content of the source. In one example, a source includes a contact record of an address book. In this case, the source may contain a version history for contact information that identifies a piece of contact information (e.g., a phone number, email address, or uniform resource locator (URL)) that was previously valid for the contact, but which has since been changed to a current version. In another example, a source includes an image depicting a company logo. In this case, the source may contain a version history identifying a logo that the company formerly used and a current version of the company logo. In the examples of the contact record and the company logo, each of the previous versions may be associated with a version number and a revision date. In some embodiments, CM database 106 may be written to and read by programs and entities outside of computing environment 100 in order to populate the repository with sources. In various examples, CM database 106 may be a database maintained by one or both of a content management system (CMS) and a customer relationship management (CRM) system. In some embodiments, CM database 106 represents one or more repositories maintained by any number of entities. For example, CM database 106 may include a web server, a file repository, a community site, or any other entity. In some embodiments, CM database 106 includes references (e.g., identifying metadata, document identifiers, or uniform resources locators) to a source that is stored outside of CM database 106, but which is accessible via CM database 106, in which case the sources of CM database 106 include the referenced source. In some embodiments, CM database 106 specifies distribution permissions for one or more sources. Distribution permissions may specify conditions under which distribution of content of a source may be allowed or prohibited. For example, distribution permissions may prohibit sharing content of a source outside of a particular group of individuals (e.g., individuals on an access control list, a department, a company, or a country).

Client UI 112 executes locally on client device 110 and operates to provide a UI to a user of client device 110. Client UI 112 further operates to receive user input from a user via the provided user interface, thereby enabling the user to interact with client device 110. In one embodiment, client UI 112 provides a user interface that enables a user of client device 110 to interact with scoring program 104 of computing device 102 via network 120. In various examples, the user interacts with scoring program 104 in order to view document 114 along with markup reflecting suitability scores as determined by scoring program 104. In one embodiment, client UI 112 is stored on client device 110. In other embodiments, client UI 112 is stored on another computing device (e.g., computing device 102), provided that client UI 112 can access and is accessible by at least scoring program 104.

In various embodiments, client device 110 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with computing device 102 via network 120. In another embodiment, client device 110 represents a computing system utilizing clustered computers and components to act as a single pool of seamless resources. In general, client device 110 can be any computing device or a combination of devices with access to computing device 102, and with access to and/or capable of executing some or all of client UI 112 and document 114. Client device 110 may include internal and external hardware components, as depicted and described in further detail with respect to FIG. 4.

Figure 2:
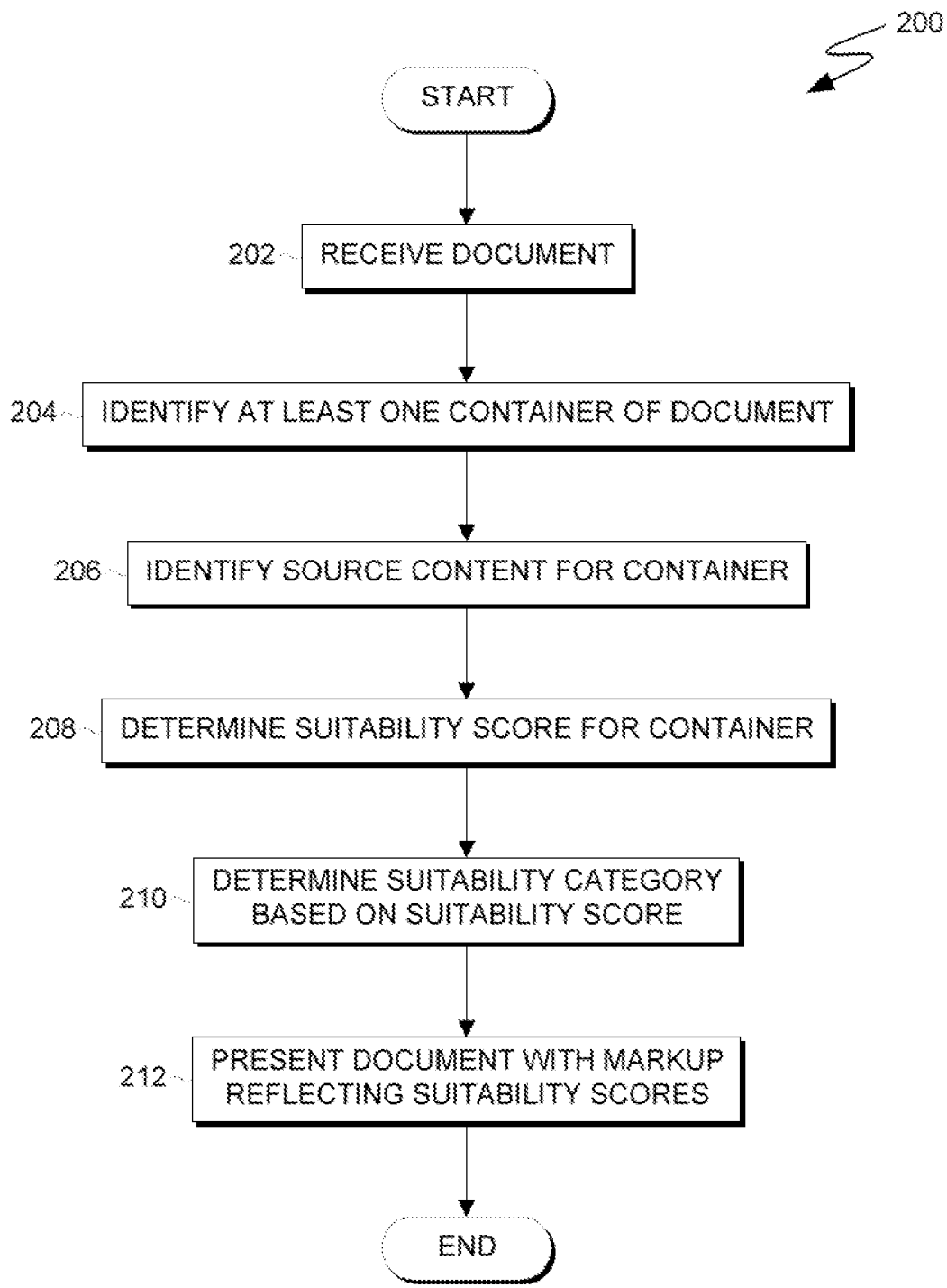
FIG. 2 is a flowchart depicting operations for embedded content suitability scoring, on a computing device within the computing environment of FIG. 1, in accordance with an embodiment of the present invention.

FIG. 2 is a flowchart depicting operations for embedded content suitability scoring, on a computing device within the computing environment of FIG. 1, in accordance with an embodiment of the present invention. For example, FIG. 2 is a flowchart depicting operations 200 of scoring program 104 on computing device 102 within computing environment 100.

In step 202, scoring program 104 receives a document. In one embodiment, scoring program 104 receives a document from client device 110. For example, scoring program 104 receives document 114 from client device 110 in response to a user interaction with client UI 112. In the illustrative example of FIGS. 3A-3B, the document is an email message, which scoring program 104 evaluates. In such an example, scoring program 104 receives the email message in response to a user interaction such as opening or editing a new outgoing email message, draft outgoing email message, or received email message. As described above in further detail, document 114 includes content.

In step 204, scoring program 104 identifies at least one container of the document. A container is a portion of content of a document that separated into a unit. For example, an email message may include one or more containers for the header, subject, body, and attachments. The header of an email message may specify recipient addressing and/or routing information. In one embodiment, each paragraph of the body of the email is a separate container. In one embodiment, scoring program 104 performs operations 206 and 208 for each of the at least one container of the document. In various embodiments, scoring program 104 identifies containers utilizing document metadata, structural analysis of the document, semantic analysis of the content, content parsing, and other natural language processing techniques. In another embodiment, scoring program 104 identifies one or more containers of document 302 (see FIGS. 3A-3B) in response to user input. For example, scoring program 104 receives user input via client UI 112 that delineates the boundaries of a container. In another example, the user input identifies a portion of content for a container.

In step 206, scoring program 104 identifies a source for a container. For example, scoring program 104 identifies a source within CM database 106 by matching the content of the container to the content of the source. In one embodiment, scoring program 104 identifies a source of the container as the source having a current or previous version of content that matches the content of the container. As mentioned above, scoring program 104 may perform operations 206 and 208 for each of the at least one container of the document. Accordingly, although operations 206 and 208 are discussed with reference to a single container, one of ordinary skill in the art will recognize that multiple iterations of operations 206 and 208 may be performed in order to process each container.

In one embodiment, scoring program 104 identifies a source utilizing an inference engine. In various examples, the inference engine utilizes one or more of the following techniques: one or more bodies of knowledge, natural language processing, profile/rules information, one or more workflows, metadata analysis, semantic analysis, cognitive computing, question answering techniques, and inference generation. The one or more bodies of knowledge may include corporate and/or industry information processing guidelines or constraints.

In step 208, scoring program 104 determines a suitability score for the container. Scoring program 104 determines the suitability score for a container by aggregating one or more scoring factors for the container. Scoring program 104 determines each scoring factor based on the contents of the container. In one embodiment, scoring program 104 represents each scoring factor as a value along a numerical range. For example, the numerical range is from 1.00 to 0.00, in which case a value of 1.00 indicates complete suitability and a value of 0.00 indicates complete unsuitability; generally, lower values represent lower suitability. In one embodiment, scoring program 104 aggregates the scoring factors by averaging the scoring factors. In another embodiment, scoring program 104 aggregates the scoring factors by averaging the scoring factors, unless the value of one or more of the scoring factors falls below a predetermined threshold (e.g., 0.10, 0.03, or 0.01), in which case the container is scored as challenged (i.e., 0.00), regardless of the values of any other scoring factors of the container.

Scoring program 104 may determine a scoring factor based on the accuracy of the contents of a container. In such embodiments, scoring program 104 compares the contents of the container to the contents of the source identified for the container (see step 206). In this case, the scoring factor represents the degree to which the contents of the container match the contents of the source. Content may be compared on a bit-by-bit basis, using a checksum, or other comparison technique. The scoring factor for accuracy is positively correlated with the closeness of the match.

In some embodiments, scoring program 104 also determines a scoring factor for a confidence score for the accuracy comparison. The confidence score reflects the degree of certainty with which scoring program 104 made the determination of closeness. In this case, the scoring factor for the confidence score is positively correlated with the confidence score.

In one embodiment, the scoring factor for accuracy is based, at least in part, on the accuracy of one or more facts or assertions stated within the content of the container. For example, if a container for a paragraph of text in the body of a paragraph contains an email address or URL that is outdated, then this inaccuracy negatively impacts the scoring factor for accuracy.

Scoring program 104 may determine a scoring factor based on the age of the contents of a container. In one such embodiment, scoring program 104 determines the scoring factor for age based on the version history of the source and a predetermined set of rules that specifies under what conditions content of a container is challenged due to age. In this case, the set of rules specifies whether content is challenged based on the version of content of the source that matches the content of the container. For example, the set of rules may specify that content of a container is challenged if the content matches a version of the source other than the current version. In another example, content is challenged if the content matches a version of the source that is older than a specified duration of time. In yet another example, content is challenged if the content matches a version of content of the source that is more than a predetermined number of revisions old.

In embodiments in which scoring program 104 employs an inference engine, the inference engine may include one or more rules that influence the determination of the suitability score of a container. For example, the inference engine may include a rule that specifies a portion of content of a source that may be modified without negatively impacting a suitability score of a container having content that matches the content of the source. Further, the inference engine may include another rule that specifies a portion of a source that, if modified, mandates a low suitability score for the container that matches the source.

In step 210, scoring program 104 determines a suitability category for a container based on the suitability score for the container. In one embodiment, each suitability category corresponds to a sub-range of values within the range of values of suitability scores. Suitability categories may include, for example, verified, acceptable, questioned, and challenged. In one embodiment, each category corresponds to a range of suitability scores such that each possible value of a suitability score corresponds to one category. For example, the verified category corresponds to suitability scores greater than or equal to a first threshold, the acceptable category corresponds to suitability scores less than the first threshold and greater than or equal to a second threshold, the questioned category corresponds to suitability scores less than the second threshold and greater than or equal to a third threshold, and the challenged category corresponds to suitability scores below the third threshold.

In step 212, scoring program 104 presents the document with markup reflecting suitability scores. Scoring program 104 presents markup for each container for which scoring program 104 determined a suitability score. The markup visually or graphically reflects the suitability score in a manner that conveys the meaning of the markup to a user. In one embodiment, scoring program 104 presents document 114 via client UI 112 with markup reflecting the suitability score determined by scoring program 104 for each container of document 114. In one embodiment, scoring program 104 also presents a legend via client UI 112 that indicates the meaning of each type of markup. In some embodiments, scoring program 104 presents one or more prompts for each container. Prompts are discussed in further detail in connection with FIG. 3B.

Each container is presented within a region of client UI 112. Scoring program 104 presents the markup for a container by presenting information reflecting the suitability category of the container via client UI 112 in a way that associates the information with the container. In one example, scoring program 104 presents the markup for a container by highlighting, shading, outlining, or otherwise graphically indicating the container. The markup for a container graphically indicates the suitability category of the container. For example, the markup may include a color, pattern, text, or other indicator that corresponds to the suitability category to which the container belongs. In one embodiment, scoring program 104 presents the markup for a container by superimposing a graphical element over at least a portion of the region of client UI 112 in which the content of the container is depicted. An example UI is discussed with further detail in connection with FIGS. 3A-3B.

FIG. 3A is a depiction of an example user interface, generally designated 300a, presenting example document 302, in accordance with an embodiment of the present invention.

Example user interface 300a depicts document 302, which is an email message. Document 302 includes containers 304a, 306a, 308a, 310a, 312a, 314a, 316a, and 318a. Container 304a is a header of the email message. Container 306a is a greeting line. Container 308a is a first paragraph of text. Container 310a is a second paragraph of text. Container 312a is an email signature. Container 314a is an image depicting a corporate logo. Container 316a is a first email attachment. Container 318a is a second email attachment.

In the depicted example, scoring program 104 identifies the containers of document 302 utilizing techniques discussed above. In particular, scoring program 104 identifies container 304 based on metadata and structural analysis of document 302. Scoring program 104 identifies container 306a as a greeting based on the text being near the beginning of document 302 and further based on the content of the container fitting a semantic pattern of a greeting (e.g., <greeting><name><transition punctuation>). Scoring program 104 identifies containers 308a and 310a based on carriage returns (i.e., line breaks) separating the text within the body of document 302 into paragraphs. Scoring program 104 may identify container 312a as an email signature based on the text being near the end of document 302 and further based on the content of the container fitting a semantic pattern corresponding to an email signature. Scoring program 104 may also (or alternatively) identify container 312a as an email signature based on metadata. Further, based on metadata or structural analysis of document 302, scoring program 104 may identify container 314a as an image, container 316a as an attachment, and container 318a as an attachment.

In one example, the content of container 306a is "Dear John Doe," but the recipient email address specified in the portion of container 304a corresponding to the "To:" field does not correspond to John Doe. In this case, scoring program 104 determines a low suitability score for one or both of container 304a or container 306a due to the inaccuracy. In another example, the content of container 306a is "Dear John Doe," and the email address of the "To:" field of container 304a matches a previous version of an email address of a contact record included in CM database 106. In this case, scoring program 104 determines a low suitability score for container 304a and may present markup including a prompt to reconcile the outdated email address to a current email address.

In one example, container 318a is an attached file. Scoring program 104 matches the file to a source of CM database 106. In this example, the source is a file that is associated with distribution permissions that specify that the file is not to be distributed outside of the company. Scoring program 104 determines whether the email message would share the file outside of the company based on the domain of each recipient email address of container 304a. In response to determining that at least one email address does not belong to the domain of the company, scoring program 104 categorizes container 318a as challenged.

Figure 3B:
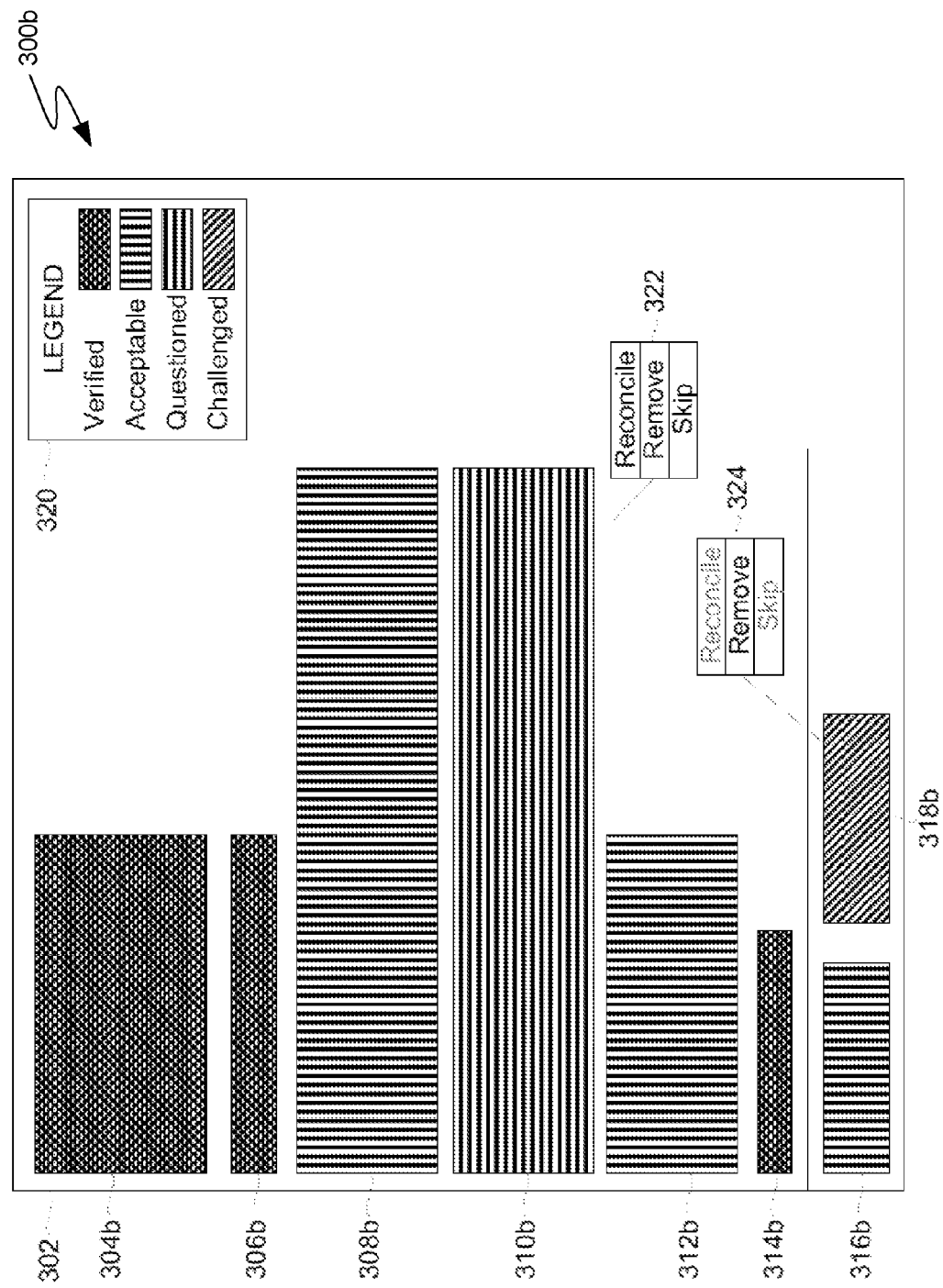
FIG. 3B is a depiction of an example user interface presenting markup for the example document of FIG. 3A, in accordance with an embodiment of the present invention.

FIG. 3B is a depiction of an example user interface, generally designated 300b, presenting markup for example document 302, in accordance with an embodiment of the present invention. For clarify of depiction, the content of the containers is omitted in FIG. 3B.

Document 302 is depicted with markup 304b, 306b, 308b, 310b, 312b, 314b, 316b, and 318b. Scoring program 104 may present such markup in any of various ways; the example depicted in FIG. 3B is for illustrative purposes only.

Example user interface 300b includes legend 320, which indicates a category indicated by a particular type of markup. Markup 304b, 306b, and 314b indicates that containers 304a, 306a, and 314a, respectively, correspond to a verified category. Markup 308b, 312b, and 316b indicate that containers 308a, 312a, and 316a, respectively, correspond to an acceptable category. Markup 310b indicates that container 310a corresponds to a questioned category. Finally, markup 318b indicates that container 318a corresponds to a challenged category.

Example user interface 300b also includes prompt 322 and prompt 324, which are examples of prompts that scoring program 104 causes client UI 112 to present. Each prompt allows a user to indicate an action for a container. Scoring program 104 performs the indicated action. In various embodiments, scoring program 104 causes client UI 112 to present one or more prompts concurrently, in sequence, or in response to a user interaction with a container. For example, the user interaction with a container may be a mouseover, hover, click, or other gesture that indicates the container. In the depicted example, up to three actions are available for each container: reconcile, remove, or skip. The reconcile action and the skip action are unavailable for containers categorized as challenged (e.g., container 318a).

In one embodiment, scoring program 104 performs a reconcile action by modifying the content of the container to match the current version of the content of the source. In another embodiment, scoring program 104 performs a reconcile action by presenting all or part of the content of the source to the user (e.g., via client UI 112). In one example, scoring program 104 highlights or otherwise calls attention to differences between the content of the container and the content of the source. In such an example, scoring program 104 may show the differences via in-line change tracking, a modal dialog box, a modeless dialog box, or other user interface element. Scoring program 104 performs a remove action by deleting the content of the container from the document. In various embodiments, scoring program 104 performs a skip action by: changing the category of the container to the verified category, changing the category of the container to a skipped category, or maintaining the category of container and disregarding the container from further analysis. Further, scoring program 104 performing the skip action may include maintaining the markup of a skipped container (regardless of any category change) or changing the markup (e.g., to correspond to the category to which the container is changed).

In some embodiments, scoring program 104 causes client UI 112 to present a prompt for one or more containers. In one embodiment, scoring program 104 causes client UI 112 to present a prompt for each container. In another embodiment, scoring program 104 causes client UI 112 to present a prompt for each container corresponding to one or more particular categories. For example, scoring program 104 causes client UI 112 to present a prompt for each container corresponding to a category other than verified.

In some embodiments, scoring program 104 requires a user to indicate an action for each presented prompt. For example, scoring program 104 presents a prompt for each container not categorized as verified and requires a user to indicate an action for each prompt before scoring program 104 allows an email message to be sent. In another embodiment, scoring program 104 requires a user to indicate an action only for those containers corresponding to particular categories. For example, scoring program 104 requires a user to indicate an action for containers categorized as questioned. In yet another embodiment, scoring program 104 automatically acts upon a container by performing an action corresponding to the category of the container. For example, scoring program 104 removes challenged containers, reconciles questioned and acceptable containers, and skips verified containers.

Figure 4:
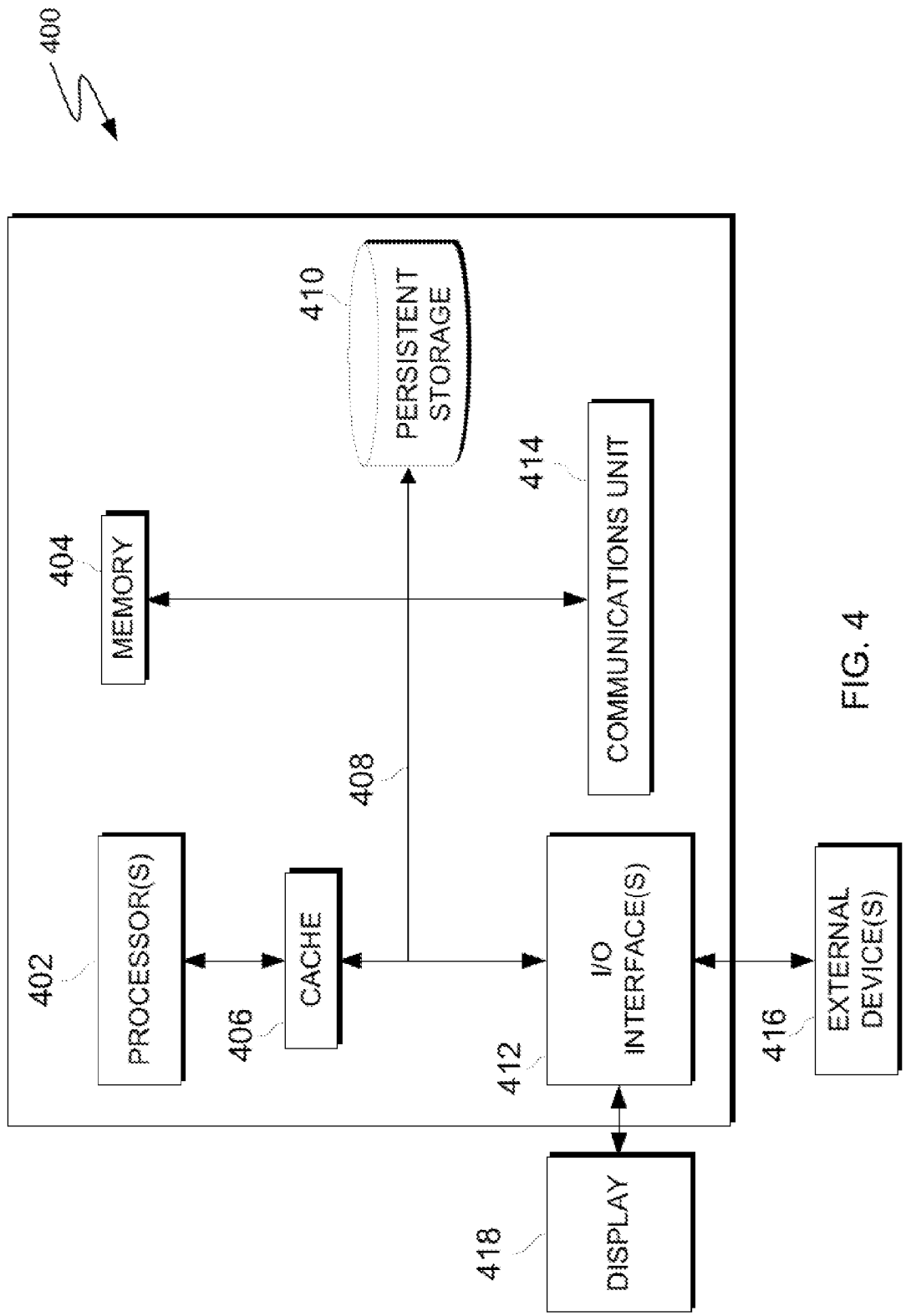
FIG. 4 is a block diagram of components of a computing device executing operations for embedded content suitability scoring, in accordance with an embodiment of the present invention.

FIG. 4 is a block diagram of components of a computing device, generally designated 400, in accordance with an embodiment of the present invention. In one embodiment, computing device 400 is representative of computing device 102 within computing environment 100, in which case computing device 102 includes scoring program 104 and CM database 106. In another embodiment, computing device 400 is representative of client device 110 within computing environment 100, in which case client device 100 includes client UI 112 and document 114.

It should be appreciated that FIG. 4 provides only an illustration of one implementation and does not imply any limitations with regard to the environments in which different embodiments may be implemented. Many modifications to the depicted environment may be made.

Computer system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to each computer system. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for embedded content suitability scoring, comprising: one or more computer processors;
one or more non-transitory computer readable storage media; program instructions stored on the one or more non-transitory computer readable storage media for execution by at least one of the one or more processors, the program instructions comprising:
program instructions to identify a plurality of containers of an email message, wherein each container includes a portion of content of the email message;
program instructions to identify a source of a container of the plurality of containers of the email message, by matching the contents of the container to contents of a matching version of the source of the container, wherein a plurality of versions of the source of the container exist;
program instructions to determine a suitability score for the container based, at least in part, on the contents of the container and the contents of the matching version of the source of the container, wherein (i) the suitability score is an aggregation of a first factor and a second factor, (ii) the first factor represents a degree to which the contents of the container match the contents of the matching version of the source of the container, and (iii) the second factor represents an age of the matching version of the source;
if the first factor or the second factor falls below a predetermined threshold value for the container, then the container is categorized into a challenged suitability category;
else, program instructions to associate the container with a questioned suitability category based, at least in part, on the suitability score, wherein the questioned suitability category is one suitability category in a group of suitability categories consisting of the questioned suitability category, a verified suitability category, an acceptable suitability category, and a challenged suitability category;
wherein each suitability category is associated with a respective sub-range of values within a predetermined range of possible values of the suitability score;
program instructions to present the email message on a user interface, the email message including a markup that (i) is associated with the questioned suitability category and (ii) visually indicates that the container is associated with the questioned suitability category;
program instructions to detect a first user interaction with the container on the user interface, and in response, present a prompt that includes a reconcile action, a remove action, and a skip action, wherein:
executing the reconcile action initiates operations to modify the contents of the container to match contents of a current version of the source of the container;
executing the remove action initiates operations to delete the contents of the container; and
executing the skip action initiates operations to change the suitability category of the container to the verified suitability category; and
program instructions to execute one of the reconcile action, the remove action, and the skip action based on a second user interaction with the container on the user interface.

* * * * *